Sept. 23, 1924.
J. C. HAGGART, JR
1,509,142
MOTOR BUS CONSTRUCTION
Filed May 23, 1922     4 Sheets-Sheet 1
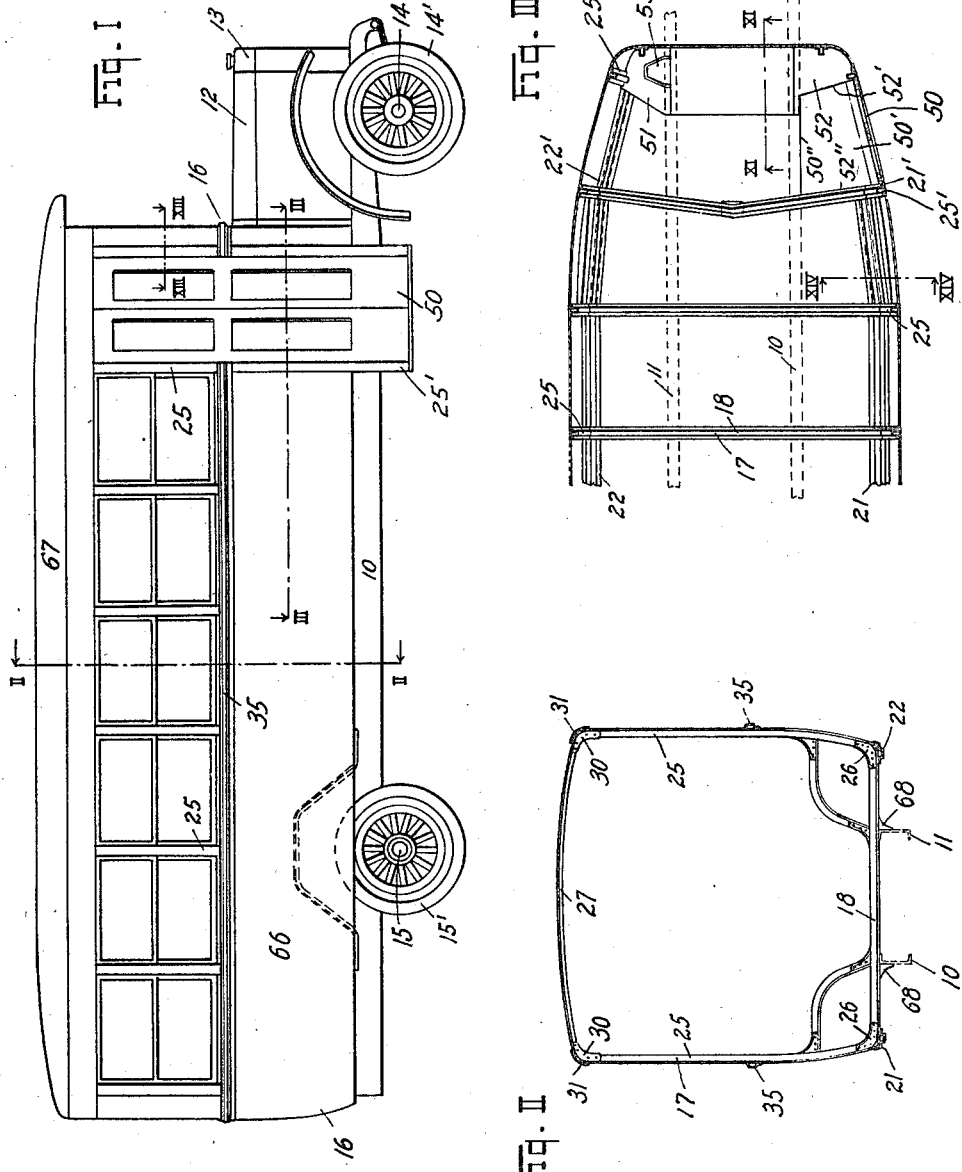
INVENTOR.
John C. Haggart, Jr.
BY Chester W. Braselton
ATTORNEYS.

Sept. 23, 1924.
J. C. HAGGART, JR
1,509,142
MOTOR BUS CONSTRUCTION
Filed May 23, 1922     4 Sheets-Sheet 2
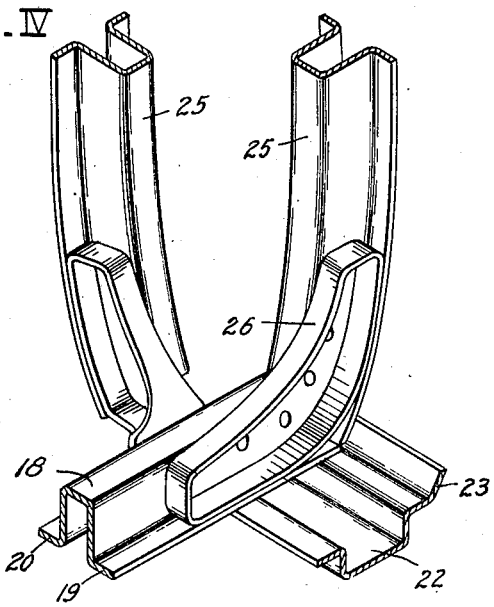
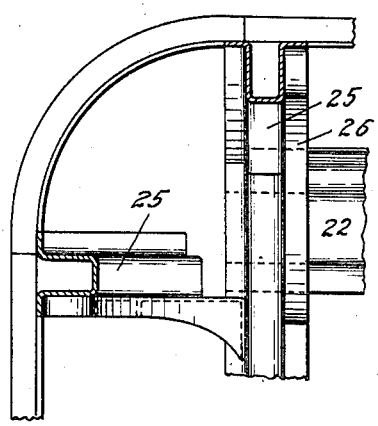
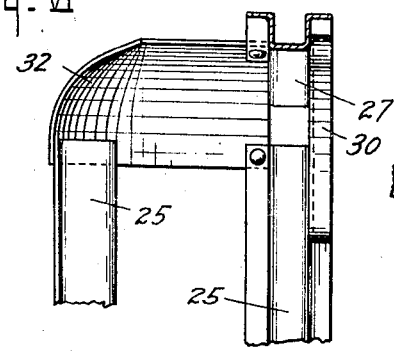
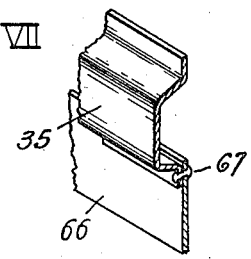
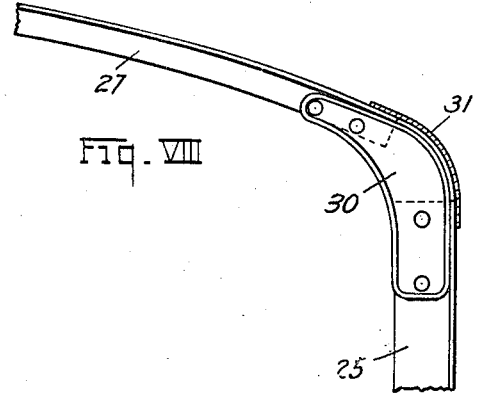
INVENTOR.
John C. Haggart, Jr.
BY
ATTORNEYS

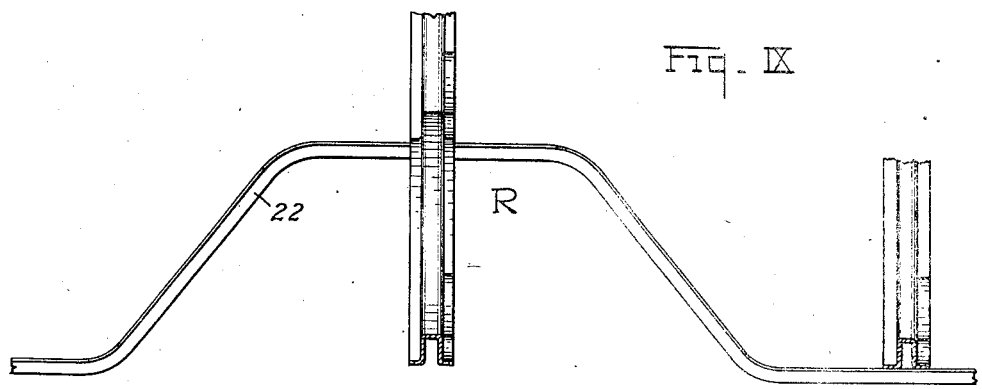
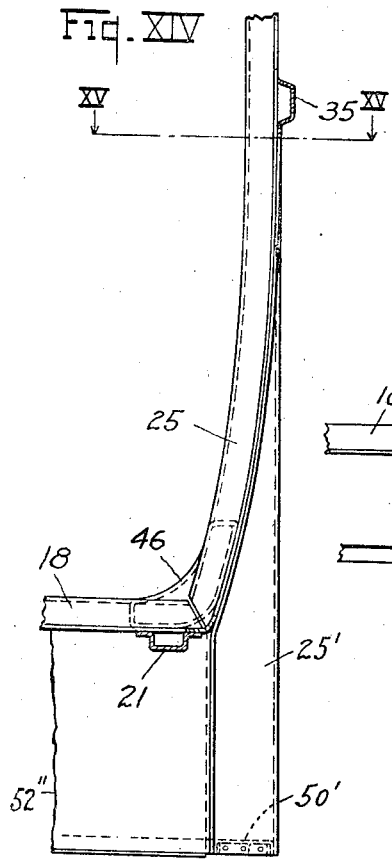
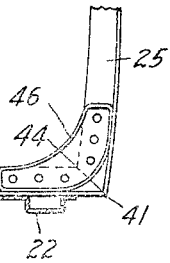
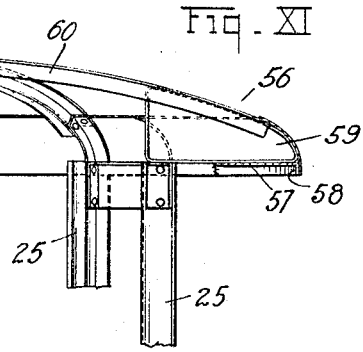
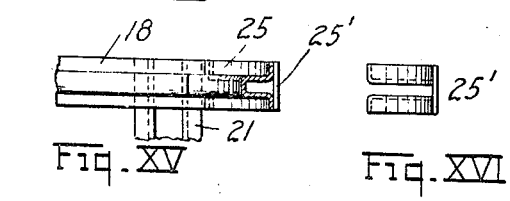

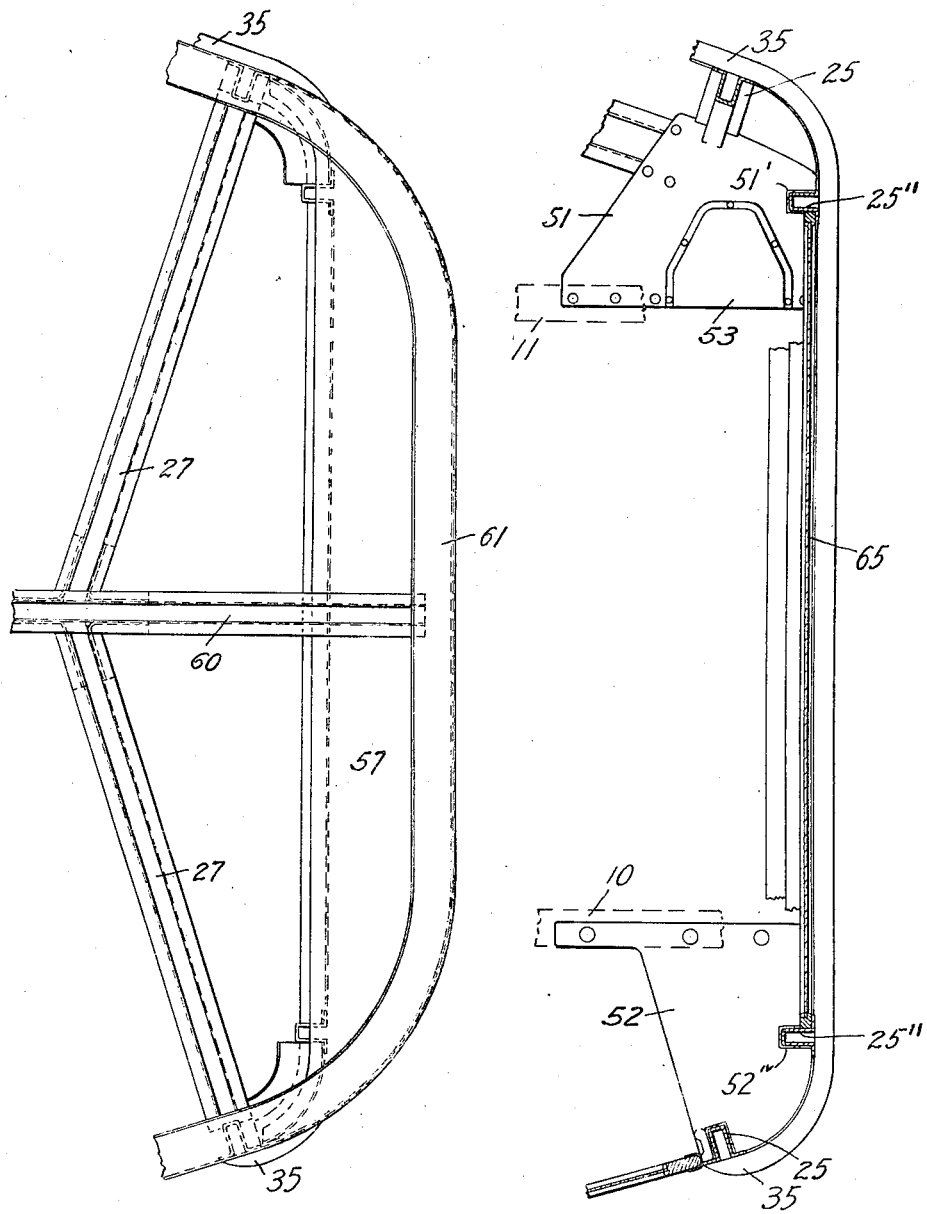

Patented Sept. 23, 1924.

1,509,142

UNITED STATES PATENT OFFICE.

JOHN C. HAGGART, JR., OF ALMA, MICHIGAN, ASSIGNOR TO REPUBLIC MOTOR TRUCK CO. INC., OF ALMA, MICHIGAN, A CORPORATION OF NEW YORK.

MOTOR-BUS CONSTRUCTION.

Application filed May 23, 1922. Serial No. 562,941.

*To all whom it may concern:*

Be it known that I, JOHN C. HAGGART, Jr., a citizen of the United States, residing at Alma, in the county of Gratiot, and State of Michigan, have invented certain new and useful Improvements in Motor-Bus Constructions, of which I declare the following to be a full, clear, and exact description.

The present invention relates to a motor bus construction having for an object to provide a combination of chassis frame and vehicle body particularly adapted to provide a large seating capacity, a low center gravity type of bus construction with a low floor to facilitate passenger entrance and exit.

A further object of the invention is to provide in a construction of this character a body frame to which the floor and vehicle body may be readily attached, the body frame being constructed and arranged to carry the entire weight, including the load, floor and body proper, the floor not being utilized and therefore not required to be so designed as to carry weight, while, at the same time, the sides of the body, whether constructed of aluminum, sheet metal or other material, may be extremely light, easily handled and secured in place on the body frame. It is an object of the invention, therefore, to provide a vehicle frame to perform these functions so constructed with a minimum weight of the frame itself to give the maximum strength therefor, properly supported on longitudinal frame members of the chassis to give a low center gravity construction with a low flooring as indicated, with the added advantage of providing a standard construction of the parts of the frame, thereby reducing to a minimum the various parts used in the completed bus body.

A further object of the invention is to provide a bus body of the character indicated in which the skeleton frame work forms the main supporting means and to which the body members may be applied as stated, whereby the external appearance of the completed motor bus may be rendered particularly pleasing in the simplicity or other characteristic appearance which may be given to the body as may be desired.

A further object is to provide a construction of the character indicated which will be extremely rigid and firm, with a minimum number of parts and a minimum weight of material used, and at the same time provide such interlocking connection of parts as will prevent frictional movement and rattling or creaking of the body when in use and when subjected to stresses and strains.

Various other objects are within the scope of this invention such as relate to the arrangement of the related elements or the structure, and to various details of construction and to economies of manufacture and numerous other features as will be apparent from consideration of the drawing and related description of a form of the invention, which may be preferred, in which—

Fig. I is a side elevation of one embodiment of the assembled motor bus construction.

Fig. II is a cross section taken on the line 2—2 of Fig. I.

Fig. III is a horizontal section looking downward taken on the line 3—3 of Fig. I.

Figs. IV, V, VI, VII and VIII are enlarged details of the frame members showing the method of relative attachment.

Figs. IX and X are longitudinal and cross sectional views respectively showing the body frame construction over the rear wheel which facilitates the low floor and low center of gravity construction.

Fig. XI is a vertical sectional view of the front top frame construction.

Fig. XII is a plan view of the front top construction, and

Fig. XIII is a horizontal sectional view taken on the line 13—13 of Fig. I. Figs. XIV, XV and XVI are details of door frame.

Referring to Figs. I, II, and III, the motor bus construction constituting an embodiment of the present invention is illustrated as being provided with a longitudinal or substantially longitudinal main frame Nos. 10 and 11, which carry at the front the engine and head, usual engine with hood and radiator, and engine hood 12 and radiator 13 illustrated in Fig. I. The frames 10 and 11 are supported on the axles 14 and 15, and the motor bus body 16 in general is located rearwardly of the front wheels 14' and extends over and rearwardly of the rear wheels 15', the body being hung low on the frame in order to materially lower the center of gravity of the motor bus.

Referring to Figs. II and III, it will be seen that the body 16 comprises a body frame 17 made up of a plurality of cross sills 18 supported directly upon the vehicle frame channel bars 10 and 11 as shown in Fig. II. The cross sectional shaping of the cross sills 18 is illustrated in Fig. IV, and the same is made preferably of pressed metal in the shape of an inverted channel with extended flanges 19 and 20. On either side of the body frame there are fore and aft longitudinal sill members 21 and 22, located underneath the cross members 18 and shaped as shown in Figs. II and IV in the form of a pressed channel member provided with an upwardly extended side member 23. The frame 17 is also provided with a plurality of spaced, vertically combined frame members and window posts 25 which are of the cross sectional shaping illustrated in Figs. IV and V and at the base thereof are joined to the cross sills 18 by flanged angular or bent gusset plates 26 riveted or otherwise secured to both the cross member 18 and window frame member 25.

The roof construction includes a plurality of similarly shaped transverse inverted channel members 27 secured at each end to the upright frame window posts 25 by angle flanged gusset plates 30 similar to the connecting plates 26.

As shown in Fig. VIII, the joint between the roof cross pieces 27 and the vertical sills 25 may be joined by a lapping curved sheet metal member 31 extending entirely around the top portion of the body frame 17, excepting at the corners and at the front, in Fig. VI. The top rear corner is illustrated in detail wherein a cup shaped sheet metal corner member 32 may be used with the lapping reinforcing strip 31 extending along the sides and rear of the frame work to give the body frame a continued uninterrupted curved symmetry at the sides and rear top corners. Likewise, extending entirely around the front, sides and rear of the frame 17 are car line sill members 35, a portion of one of which is illustrated in detail in Fig. VII and is shown as located on the outside of and supporting the body covering material as will hereinafter appear.

Figs. IX and X illustrate the construction of the body frame 17 immediately over the rear axle or rear wheels 15'. It will be seen that in this particular location, the transverse cross sill 18 is cut short at 40, and the vertical frame member and window post 25 is cut short at 41, these two parts being joined by an intermediate curved channel member 42 transversely constructed similar to the cross sill 18, the same being provided with bevelled edges 43 and 44 to make a close joint with the cross sill 18 and window frame member 25 respectively. Angular gusset joint connecting members 45 and 46, riveted as indicated in Fig. X, securely and rigidly join the curved wheel element 42 with the cross sill 18 and window frame member 25. At this space, fore and aft, longitudinal side frame sill members 21 and 22 are arched as illustrated in Fig. IX, so that with the curved joining channel member 42 and the upwardly arched transverse sills 21 and 22, a recess portion R in the frame is provided to receive the rear wheels 15'. A pair of mudguards may be used under the frame over the rear wheels, if desired.

On the front righthand side, the sheet metal skeleton frame construction 17 is arranged so that a door 50 of any desired type may be suitably hung on the body when completed, it being noted that the longitudinal car sill member 35 is cut away at this portion. The door sill and entrance step is shown in Figs. III, and XIV to XVI where it will be seen that the frame member 25 has an auxiliary finishing post 25' illustrated in plan in Fig. XVI and attached to and extending upwardly on the flanges of the member 25 up to the car sill 35. A well shaped step plate 50' is provided with a back 50'' and side members 52' forming the step tread for the passenger entrance and exit; the back 50' constituting the riser.

The front of the frame 17 is illustrated in Figs. III, XI, XII and XIII, where it will be seen that the bottom fore and aft sill members 21 and 22 extend inwardly or converge at 21' and 22' and enlarged gusset plates or reinforcing brackets 51 and 52 join the sill members and vertical frame members 25 with the chassis frame longitudinal supporting channels 10 and 11. The forward lefthand bracket and gusset plate 51 is cut away at 53 to provide an opening through which the steering post and steering controlling shaft and rods may be located. At the front top, the cross roof members 27 are arranged angularly as shown to give increased bracing and rigid strength to this part of the frame, the forward portion of the frame being constructed as shown in Figs. XI and XII to form a sheet metal front overhanging visor 56. To this end a visor plate 57 shaped as indicated in Fig. XII, having flanges 58 shown in Fig. XI, is connected by a vertical web or webs 59 to a central longitudinal roof flange member 60, while the corner reinforcing and finishing member 61 forms substantially a continuation of the top longitudinal corner reinforcing plates 31 shown in Fig. II and forms means to facilitate the joint of the visor member 57 at either side of the front through the top longitudinal sill members and vertical posts 25 located at this joint, with the connection of the parts in the particular embodiment of the invention disclosed herein being particularly illustrated in Figs. XI and XII.

A pair of front vertical windshield frame members 25″ are shown as extending from top to bottom of the frame, connected at the top by suitable connecting plates to the visor construction just described and connected at the bottom with the bottom front corner reinforcing plates 51 and 52 as shown in Fig. XIII, fitting in recesses 51′ and 52″. The windshield as illustrated at 65 may be of any desired construction suitably supported for adjustment in the front of the bottom frame.

From this construction, it will be seen that the frame 17 is made up of a plurality of drawn or pressed sheet metal preferably channeled chambers which may be of standard construction of suitable length and curvature to form the entire completed skeleton frame construction. It will be also noted that in the frame construction the channeled portions of the members employed extend inwardly of the body frame 17 and have the flanges thereof located exteriorly to facilitate the application of the outside material as will appear.

The body covering side panel illustrated at 66 may be of aluminum, for example, or other light sheet metal or of any desired material, and may be suitably secured in place by the car sill member 35 in the manner illustrated in Fig. VII where it will be seen that the body material 66 is secured by rivets 67 against the lower flange of the sill member 35, the longitudinal car sill member 35 being secured to the upright window post and frame members 25 by riveting if desired or by the employment of a lap connecting plate.

The floor of the vehicle is directly supported on the several cross sills 18, and it will be seen that the load and weight of the vehicle is carried thereby directly to the longitudinal chassis frame members 10 and 11. To this end, if desired, brackets 68 may be used to brace the connection of the several sills to the longitudinal frame members.

The vehicle top 67 may be suitably secured to the top frame members 27 as will be apparent from the foregoing.

It will be noted that the several main elements, longitudinal fore and aft sill members, cross sill members, vertical frame members, and roof elements are preferably constructed of a standard cross sectional area to facilitate the construction of the frame in its entirety and reduce the various parts to form a standard shape from which the several parts of the frame may be made.

It is apparent that, within the spirit of the invention, modifications and different arrangements may be made other than as herein disclosed, and the present disclosure is illustrative merely, the invention comprehending all variations illustrated.

Having thus described the invention, what I desire to secure by Letters Patent of the United States and claim is:

What I claim is:

1. In a motor bus construction having front and rear wheels and longitudinal framed beams, a vehicle body frame carried thereby, including cross members, upright members, and roof members located rearwardly of the front wheels and over and rearwardly of the rear wheels of said vehicle, the frame being directly supported on said beams and recessed over said wheels to permit said frame to be located below the top of said wheels, said recessed portions of said frame being formed by arching the transverse cross members upwardly at either side thereof, and providing a plurality of short, vertical elements of said frame over said wheels.

2. In a motor bus construction of the character indicated, a body frame made up of a plurality of suitably shaped metallic sectional elements to form the bottom sides and top thereof, the top construction including a plurality of transverse roof members located at the top portion of the frame and a pair of angularly shaped transverse top members at the front with a central longitudinal top brace, the body frame having a front overhanging visor with one end of said central top member connected thereto and the pair of angle top members connected to said central member.

3. In a motor bus construction having front and rear wheels, longitudinal beams, a low hung frame carried thereby, including bottom longitudinal and cross, upright and roof elements located in rear of both front and rear wheels, the longitudinal frame members arched to permit rear wheels to rotate therein and the bottom and upright members cut short thereover with a curved element connecting the short cross and upright elements.

4. In a motor bus construction of the character indicated, a plurality of longitudinal chassis frame members, a skeleton vehicle body frame supported thereby including a plurality of transverse bottom cross sills directly supported on said longitudinal members, a plurality of side members secured to said cross members, and a plurality of said roof members secured to said side members, the frame being provided with recessed portions adjacent the rear wheels of said vehicle, and a plurality of braces between said cross sills and said longitudinal members, the frame being adapted to transmit the weight of the load and floor directly to said longitudinal chassis members, and a metal door frame and step construction attached to said frame, comprising a sheet metal well having a bottom forming the step and an upright back portion forming the riser secured to certain of said cross sills and downwardly extending door side frame posts attached to the side members of the frame on either side of the door and a door positioned in said door frame and enclosing said step.

5. In a motor bus construction of the character indicated, a combination of a pair of longitudinal channel bar members supported on the axles of the vehicle and a skeleton body frame work carried thereby composed of a plurality of metal frame members channel shaped in cross section and arranged with the channel thereof extending inwardly of the frame and the flanges thereof located exteriorly to provide increased total area of the several flanged frame members to which the exterior body of the vehicle may be secured, and a door and step construction attached to said frame, said construction comprising portions secured to the frame members, and door posts attached to said members of the frame, said door completely enclosing the step construction.

In testimony whereof I affix my signature.

J. C. HAGGART, Jr.